US009049271B1

(12) United States Patent
Hobbs et al.

(10) Patent No.: US 9,049,271 B1
(45) Date of Patent: Jun. 2, 2015

(54) SWITCH-INITIATED CONGESTION MANAGEMENT METHOD

(71) Applicant: Teradici Corporation, Burnaby (CA)

(72) Inventors: David Victor Hobbs, Surrey (CA); William John Dall, New Westminster (CA)

(73) Assignee: Teradici Corporation, Burnaby, British Columbia (CA)

( * ) Notice: Subject to any disclaimer, the term of this patent is extended or adjusted under 35 U.S.C. 154(b) by 0 days.

(21) Appl. No.: 14/103,575

(22) Filed: Dec. 11, 2013

Related U.S. Application Data

(63) Continuation of application No. 12/838,058, filed on Jul. 16, 2010, now abandoned.

(60) Provisional application No. 61/226,241, filed on Jul. 16, 2009.

(51) Int. Cl.
| | |
|---|---|
| *H04N 7/01* | (2006.01) |
| *H04L 29/06* | (2006.01) |
| *H04L 12/825* | (2013.01) |
| *H04N 21/24* | (2011.01) |
| *H04N 21/647* | (2011.01) |

(52) U.S. Cl.
CPC .............. *H04L 65/601* (2013.01); *H04L 47/25* (2013.01); *H04N 21/2402* (2013.01); *H04N 21/64769* (2013.01); *H04N 7/0127* (2013.01); *H04N 21/64723* (2013.01); *H04L 65/605* (2013.01)

(58) Field of Classification Search
None
See application file for complete search history.

(56) References Cited

U.S. PATENT DOCUMENTS

| | | | |
|---|---|---|---|
| 6,075,768 A | 6/2000 | Mishra | |
| 7,191,440 B2 | 3/2007 | Cota-Robles et al. | |
| 8,209,429 B2 | 6/2012 | Jacobs et al. | |
| 2007/0078948 A1 | 4/2007 | Julia et al. | |
| 2008/0025400 A1 | 1/2008 | Sugimoto et al. | |
| 2008/0107173 A1 | 5/2008 | Van Beek | |
| 2008/0165861 A1* | 7/2008 | Wen et al. ................ | 375/240.26 |
| 2010/0079575 A1* | 4/2010 | Ali et al. ................... | 348/14.13 |
| 2010/0111410 A1* | 5/2010 | Lu et al. .................... | 382/166 |
| 2010/0121972 A1 | 5/2010 | Samuels et al. | |
| 2010/0161761 A1* | 6/2010 | Yu et al. ................... | 709/219 |

(Continued)

OTHER PUBLICATIONS

Charny et al., "Congestion Control With Explicit Rate Indication", Communications, 1995. ICC'95 Seattle, 'Gateway to Globalization', 1995 IEEE International Conference on Communications, vol. 3, pp. 1954-1963, Jun. 18-22, 1995.

(Continued)

*Primary Examiner* — Marcus R Smith
(74) *Attorney, Agent, or Firm* — Moser Taboada

(57) ABSTRACT

A method for managing media communications. In one embodiment, the method comprises establishing a session to a computer over a network and through a switch; generating first and second frames of an image stream; identifying updated regions of the first and the second frames, wherein the updated region of the first frame has a first size and the updated region of the second frame has a second size different from the first size; compressing, based on a value from a congestion manager, the updated regions of the first and the second frames to generate a first and a second encoding, respectively; transmitting the first encoding over the session at a first rate determined from the first size and the value; and transmitting the second encoding over the session at a second rate determined from the second size and the value, wherein the second rate is different from the first rate.

15 Claims, 11 Drawing Sheets

(56) References Cited

U.S. PATENT DOCUMENTS

2010/0299552 A1 11/2010 Schlack et al.
2010/0316066 A1 12/2010 Leung

OTHER PUBLICATIONS

Bing et al., "Traffic Management of Multimedia over ATM Networks", IEEE Communications Magazine, vol. 37, No. 1, pp. 33-38, Jan. 1999.
Floyd et al., "Equation-Based Congestion Control for Unicast Applications," In Processing of the Conference on Applications, Technologies, Architectures, and Protocols for Computer Communication, Stockholm, Sweden, pp. 1-14, Aug. 28-Sep. 1, 2000.
Barbera et al., "DARED: A Double-Feedback AQM Technique for Routers Supporting Real-Time Multimedia Traffic in a Best-Effort Scenario", Control, Communications and Signal Processing, 2004. First International Symposium, pp. 365-368, Tunisia, Mar. 2004.
Lubonski et al., "An Adaptation Architecture to Improve User-Perceived QoS of Multimedia Services for Enterprise Remote Desktop Protocols", Next Generation Internet Networks, 2005, pp. 149-156.
Bergamasco, "Data Center Ethernet Congestion Management: Backward Congestion Notification", IEEE 802.1 Interim Meeting, Berlin, Germany, pp. 1-25, May 12, 2005.
"Statistical Multiplexing Whitepaper", Tandberg Corporation, pp. 1-2, Sep. 2008.

\* cited by examiner

SWITCH-INITIATED CONGESTION MANAGEMENT METHOD

CROSS-REFERENCE TO RELATED APPLICATIONS

This application is a continuation of co-pending U.S. patent application Ser. No. 12/838,058, entitled "Switch-Initiated Congestion Management Method" and filed Jul. 16, 2010, which claims benefit of U.S. provisional patent application Ser. No. 61/226,241, filed Jul. 16, 2009. Each of the aforementioned related patent applications is herein incorporated in its entirety by reference.

BACKGROUND OF THE INVENTION

1. Field of the Invention

Embodiments of the present invention relate generally to techniques for managing the flow of encoded image streams from various host domains to various associated client domains through common packet switching and communication infrastructure. More specifically, a packet switch provides control feedback information to a set of independent encoders in order to manage the aggregate perceptual quality of client images.

2. Description of the Related Art

The pursuit for improved efficiencies in corporate computer infrastructure has resulted in an emerging trend to replace desktop computers with virtualized desktop infrastructure (VDI), where low complexity client devices connect to virtualized desktop computers located in a corporate data center via LAN or WAN networks. In such a model, high performance server computers in the data center each play host to many virtualized desktops and some form of remote computing protocol is deployed to facilitate the communication of the graphical user interface (GUI) from each virtualized desktop, typically to a corresponding remote client device. One challenge with such an approach relates to enabling network infrastructure to support the simultaneous communication of massive quantities of encoded media associated with many concurrent remote computing sessions without excessive network congestion. Such congestion causes packet loss or increased latency, either of which contributes to a degradation in the remote computing user experience. This is of particular significance to network protocols such as user datagram protocol (UDP) which lack inherent congestion control mechanisms.

Various explicit methods for managing network congestion related to continuous media streams, usually video, are known to the art. In the case of ACTIVE QUEUE MANAGEMENT (AQM), a network router drops packets when its buffers overflow. The specific AQM algorithm used in the Internet is called "Random Early Detection" (RED). Explicit Congestion Notification (ECN) is another method in which a bit in a packet en route to a client device is set by a network switch in the presence of congestion. The receiver then signals the congestion state to the transmitter during the packet acknowledgement process. In a related Forward Explicit Congestion Notification (FECN) method proposed for datacenter Ethernet networks, sources periodically generate probe packets that are modified by the switches along the path and then reflected by the receivers back to the sources. The sources react to the feedback received in the returning probes and set their video rate accordingly. If there are multiple congestion points on the path of a flow, multiple backward control messages will be sent back while only one of these— one with the highest level of congestion indication—will dominate the future rate of the flow. Backward Congestion Notification (BCN) is an alternative scheme proposed for congestion notification in datacenter Ethernet networks (under IEEE 802.1Qau group) in which congestion points signal the sender in the event of congestion, rather than requiring the receiver to reflect probe packets.

Datagram congestion control protocol (DCCP) and Dynamic Video Rate Control (DVRC) are other methods used in streaming video applications which rely on sender and receiver interaction to determine bandwidth and round trip time (RTT) estimates to facilitate adjusting the rate of the transmitted video stream.

The Asynchronous Transfer Mode (ATM) network architecture enables multimedia transport at guaranteed service levels using various traffic classes with different service policies. Constant bit rate (CBR) and variable bit rate modes (VBR) provide guaranteed cell rates negotiated during connection establishment, while available bite rate (ABR) mode uses available bandwidth to achieve further network utilization and the possibility of bandwidth renegotiation during transmission. Multimedia ATM architectures support continuous adjustment of the source rate based on congestion feedback information provided from the network while the connection remains active. In the presence of multiple video connections, fair bandwidth sharing or bandwidth scheduling methods may be used to allocate the bandwidth. However, such schemes lack flexibility to adjust to time-varying nature of video.

Generally, congestion control methods directed to rate control of multiple video streams have not been optimized to meet the specific requirements of a VDI deployment in which network bandwidth and user experience associated with multiple concurrent remote computing sessions should be managed at a system level. Therefore, there is a need in the art for managing network congestion associated with multiple concurrent remote computing sessions.

SUMMARY OF THE INVENTION

Method for managing media communications substantially as shown and/or described in connection with at least one of the figures, as set forth more completely in the claims.

Various advantages, aspects and novel features of the present disclosure, as well as details of an illustrated embodiment thereof, will be more fully understood from the following description and drawings.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

The invention may be implemented in numerous ways, including as a process, an article of manufacture, an apparatus, a system, and as a set of computer-readable descriptions and/or instructions embedded on and/or in a computer-readable medium such as a computer-readable storage medium. In this specification, these implementations, or any other form that the invention may take, may be referred to as techniques. The Detailed Description provides an exposition of one or more embodiments of the invention that enable improvements in features such as performance, power utilization, cost, scalability, efficiency, and utility of use in the field identified above. The Detailed Description includes an Introduction to facilitate the more rapid understanding of the remainder of the Detailed Description. Additionally, the invention encompasses all possible modifications and variations within the scope of the issued claims.

The term processor as used herein refers to any type of processor, CPU, microprocessor, microcontroller, embedded processor, media processor, graphics processor, or any other programmable device capable of executing and/or interpreting instructions in a form of software (such as microcode, firmware and/or programs).

The term software as used herein refers to any type of computer-executable instructions for any type of processor, such as programs, applications, scripts, drivers, operating systems, firmware, and microcode. Computer-executable instructions include any types of instructions performed by a processor, such as binary instructions that are directly performed, instructions that are translated and/or decoded prior to being performed, and instructions that are interpreted.

Figure 1:
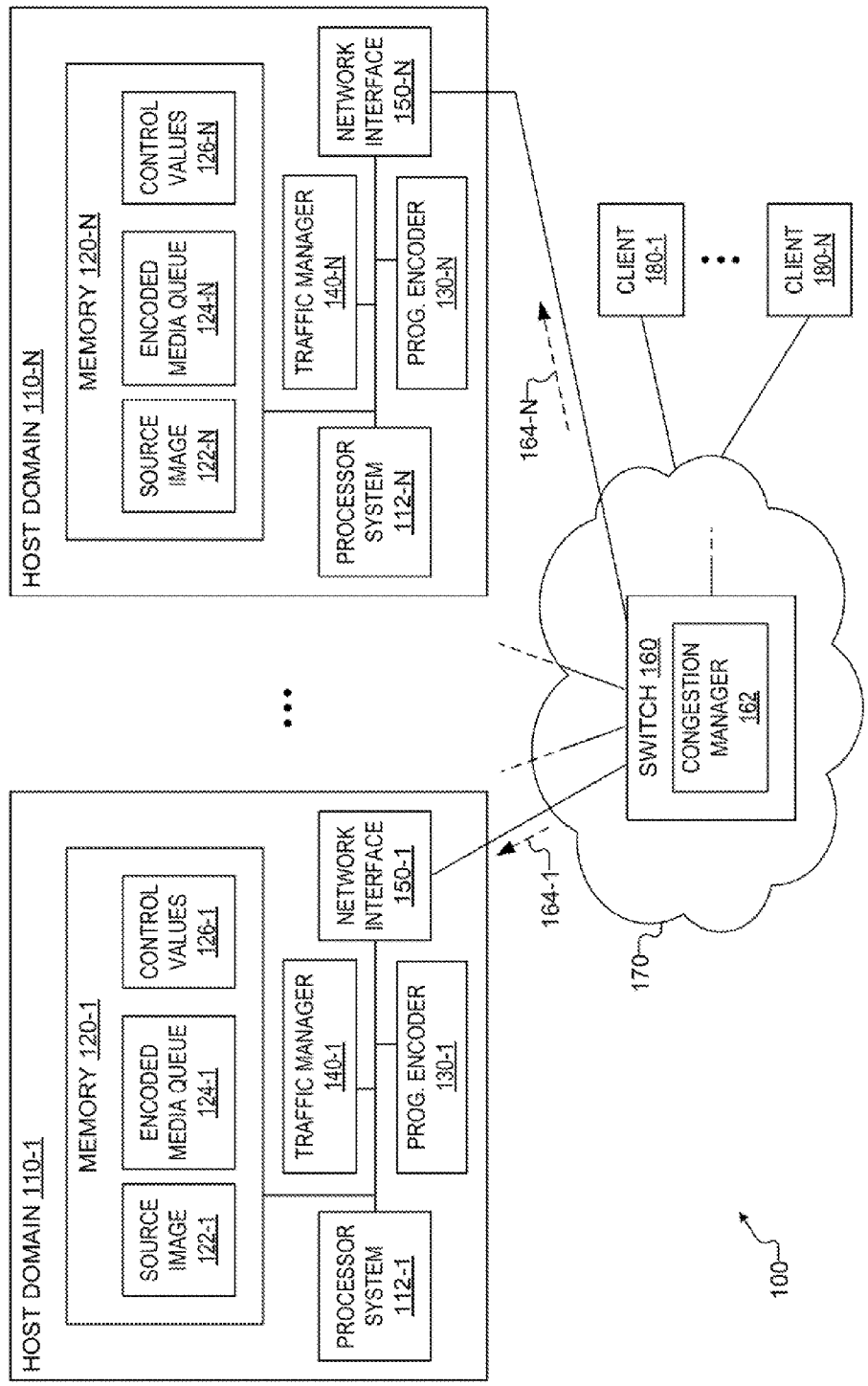
FIG. 1 is an illustration of a networked image transfer system comprising multiple host domains connected to a plurality of clients.

FIG. 1 illustrates selected details of an embodiment of a networked image transfer system 100 ("system 100") comprising multiple host domains 110-1 through 110-N, each connected to one of a plurality of clients 180 (illustrated as a client 180-1 and a client 180-N) by a common switch 160 (i.e. a network device) and computer network 170. While system 100 depicts two host domains 110 and two clients 180, the methods and apparatus described are applicable to many host domains coupled to many clients. In an exemplary embodiment, a server platform hosts up to 128 host domains 110, each coupled to one of 128 clients 180 via network 170.

In an embodiment, each host domain 110 is an independent computer or part of a computing platform, such as a virtual machine on a computer server or the like, coupled to and enabled to communicate with one or more communication endpoints, such as one or more of the plurality of clients 180. Each client 180 typically comprises an image decoder function, one or more computer display devices, and various I/O devices, such as a keyboard, mouse, and the like. Each host domain 110 establishes a communication session with one of the plurality of clients 180 and uses the communication session to communicate a plurality of encoded image updates to the associated client 180 (i.e., each host domain 110 is typically associated with one client 180 by means of the communication session), or the host established a communication session with an alternative communications endpoint such as an image storage system or various combinations of display and storage endpoints.

Host domain 110 is an environment generally designated for running software associated with a user interface located at client 180. In various embodiments, the host domain 110 comprises software components such as operating system, driver software, and application software located in memory 120 (illustrated as a memory 120-1 and a memory 120-N) for execution by a processor sub-system 112 configured to execute machine readable instructions. The application software, (e.g., word processing software, spreadsheets, financial data presentation, video or photo display or editing software, graphics software such as Computer Aided Design (CAD) software, Desktop Publishing (DTP) software, digital signage software, or the like) executes in conjunction with graphics drivers (e.g., OPENGL from SILICON GRAPHICS corporation, DIRECTX from MICROSOFT CORPORATION, ADOBE FLASH) or image composition software (e.g., the WINDOWS VISTA Desktop Windows Manager (DWM), or QUARTZ or COCOA from APPLE CORPORATION) to generate dynamic source image 122 (illustrated as a source image 122-1 and a source image 122-N) for display presentation. Different regions of source image 122 are typically updated at different times in an asynchronous fashion by any of the installed software applications. Unlike a constant frame rate video sequence, these image updates may be sporadic from both spatial and temporal perspectives. Source image 122 is maintained in one or more designated regions of memory 120, such as one or more frame buffer regions or alternative suitable image storage memory. It will be recognized by those skilled in the art embodiments of memory 120 may further comprise other application software, operating system components, drivers, administrative software and the like, not depicted in FIG. 1 so as not to obscure aspects of the present invention.

Memory 120 comprises any one or combination of volatile computer readable media (e.g., random access memory (RAM), such as dynamic random access memory (DRAM), static random access memory (SRAM), extreme data rate (XDR) RAM, Double Data Rate (DDR) RAM and the like) and nonvolatile computer readable media (e.g., read only memory (ROM)), hard drive, tape, CDROM, DVDROM, magneto-optical disks, Erasable Programmable Read-Only Memory (EPROM), Electrically Erasable Programmable Read-Only Memory (EEPROM), Flash EPROM and the like). Moreover, memory 120 may incorporate electronic, magnetic, optical, and/or other types of storage media. Each host domain 110 further comprises additional elements, such as programmable encoder 130 (illustrated as an encoder 130-1 and an encoder 130-N), a traffic manager 140 (illustrated as a traffic manager 140-1 and a traffic manager 140-N), and a network interface 150 (illustrated as a network interface 150-1 and a network interface 150-N). The programmable encoder 130, traffic manager 140, and network interface 150 are each implemented as a hardware element (such as part of an Application Specific Integrated Circuit (ASIC) or integrated hardware function of a processor subsystem), a software component in memory 120 (executed by a processor system 112, for example in the domain of a virtual machine (VM), as one or more virtual appliances executed by a hypervisor or as a combination of virtual appliances and software components executed in the domain of a VM), a software function executed by a processor external to processor system 112 (such as a Reduced Instruction Set Computer (RISC) processor integrated in an ASIC), or as a combination of software and hardware components.

The processor system 112 (illustrated as a processor system 112-1 and a processor system 112-N) typically comprises one or more central processing units (CPUs), one or more graphical processing units (GPUs) or a combination of CPU and GPU processing elements. In some embodiments, one or more host domains 110 are executed by a common CPU platform, such as a server comprising multiple CPU cores or separate CPUs. In such embodiments, such CPU cores or CPU may, for example, be interconnected by a HYPERTRANSPORT fabric or the like, with computer memory 120-1 and computer memory 120-N distributed between CPUs accordingly. Examples of a well known suitable CPU include mobile, workstation or server class processors such as 32-bit, 64-bit, or other CPUs including OPTERON, ATHLON, or PHENOM class microprocessors manufactured by AMD Corporation; XEON, PERYN, PENTIUM, or X86 class processors manufactured by INTEL; SPARC microprocessors manufactured by SUN MICROSYSTEMS Inc.; or a microprocessor such as a PowerPC processor. However, any other microprocessor platform designed to perform the data processing methods described herein may be utilized. In an embodiment, the processor system 112, encoder 130, traffic manager 140, and network interface 150 are coupled to memory 120 by one or more bus structures, such as memory, image, and/or I/O busses known to the art.

In some virtualized embodiments in which host domains 110-1 through 110-N each comprise a virtual machine executed by a common processing sub-system (i.e., host domains 110-1 through 110-N are executed by the same processor system 112 or a hypervisor abstracts a set of processor systems 112 from a set of host domains 110, each host domain 110 comprising memory 120 and in some cases each host domain 110 further comprising software executable encoding, traffic management and/or network interface functions), the operating system of each host domain 110 is scheduled by a hypervisor function omitted from FIG. 1. In an exemplary embodiment, each host domain 110 comprises an operating system, such as a WINDOWS operating system from MICROSOFT, Inc. (e.g., WINDOWS XP or WINDOWS 7), a LINUX operating system available from many vendors, or a UNIX operating system, also available from many vendors including HEWLETT-PACKARD, Inc., or SUN MICROSYSTEMS, Inc., where the operating system is scheduled by a hypervisor. The hypervisor may be one of several commercially available hypervisor products including VMWARE ESX SERVER from VMWARE corporation, XENSERVER from CITRIX corporation, or HYPER-V from MICROSOFT corporation. The operating systems and software components of encoder 130, traffic manager 140 and network interface 150 of different host domains 110-1 through 110-N may be executed by the same processor system 112 or different processor systems. Furthermore, in various embodiments in which at least part of traffic manager 140 or network interface 150 of the same domain are executed as virtual appliances, such virtual appliances may be executed by the same processor system 112 or different processor systems.

Figure 9:
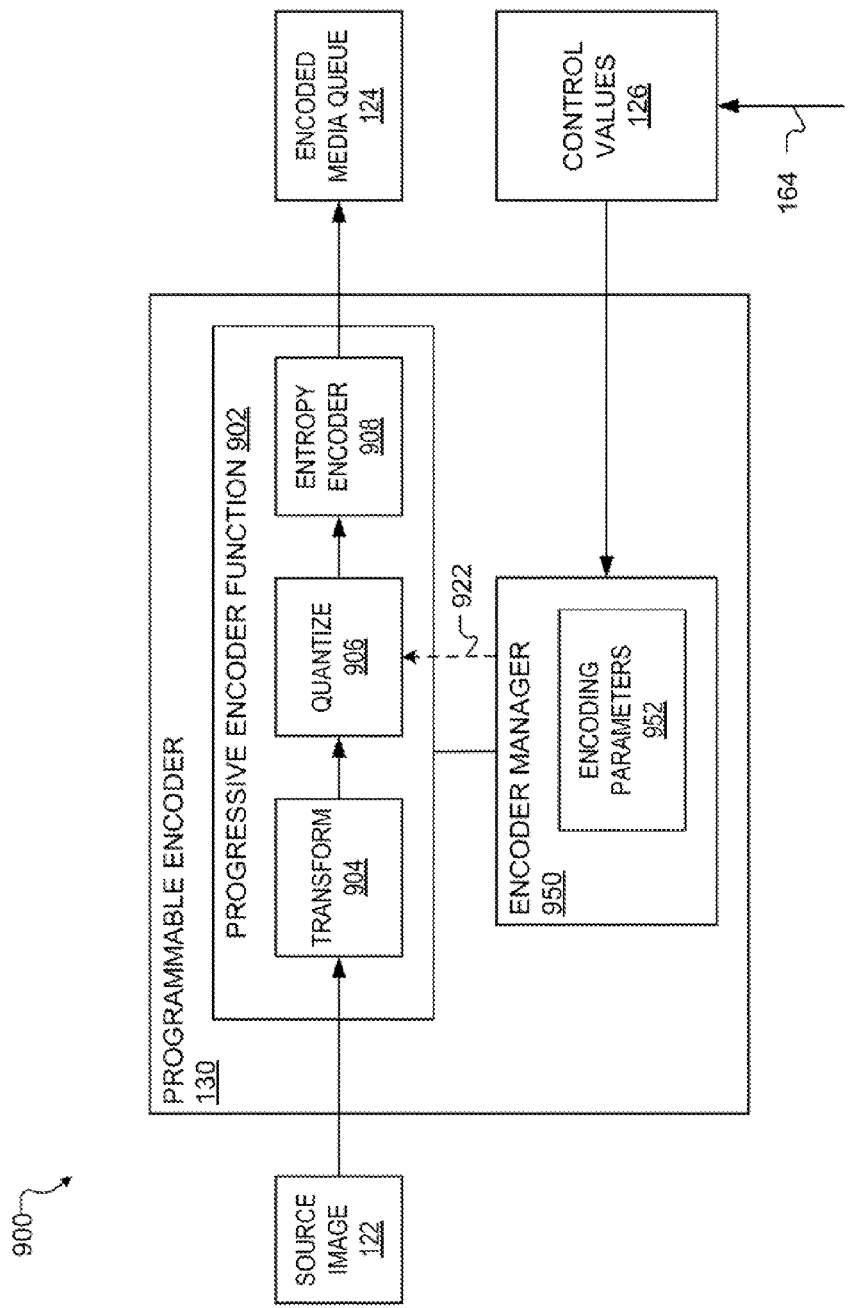
FIG. 9 is a block diagram of a programmable encoder.

Generally, the programmable encoder 130 (also referred to as encoder 130) is an image stream encoder that uses various encoding techniques (e.g., image transformations) defined by a set of encoding parameters to encode source image 122 and maintain encoded media queue 124, for example by compressing areas of source image 122 identified as changed since a previous encoding iteration. Based on encoding parameters, encoder 130 adjusts encoded image quality (e.g., by adjusting the image quantization and related compression ratio) to regulate the fill rate of media queue 124 in response to dynamically updated control values 164 (shown as a control value 164-1 and a control value 164-N) received from switch 160 via network 170. Note that control values 164-1 and 164-N are generally the same value related to a target egress channel availability of switch 160. In some embodiments, host domain 110 receives several different control values from different congestion managers in network 170. In such cases, the control values are stored in memory 120 as a list of control values 126 and a suitable control value from the list of control values 126 (e.g., the control value associated with the most constrained link) is used to determine encoded media bit rate and encoding parameters, In various embodiments, media encoding priorities used by the encoder 130 are determined according to image update attributes (e.g., time elapsed since updated image content has been transmitted), media type (e.g., lossless content updates prioritized over residual updates for natural image types), or device-dependent attributes (e.g., pointer updates or updates related to cursor position prioritized over other content updates). In an embodiment, image regions that influence user-interaction latency or perceptual quality (such as a pointer location update or an initial encoding associated with the progressive build of a changed display image) are prioritized over regions with less influence on perceptual experience (such as progressive image refinements or non-interactive video images). An embodiment of encoder 130 is depicted in FIG. 9.

The encoded media queue 124 (illustrated as a queue 124-1 and a queue 124-N) comprises one or more regions of memory 120 designated for the storage of encoded image data in the form of compressed pixels, progressive refinement updates, video descriptors and/or drawing commands generated by encoder 130.

The traffic manager 140 is generally a data management and scheduling function that manages bandwidth allocation, communication priority, and data shaping of encoded media between encoded media queue 124 and network 170 at a transmission rate derived from control values 164 received from switch 160 via network 170. In an embodiment, the control value 164 provides a perceptual quality index to host domain 110 which is utilized by encoder 130 to specify an encoder quality setting and utilized by traffic manager 140 to specify a frame transmission rate. The control value 164 may be expressed as an image transmission bandwidth in terms of the number of bits-per-pixel per-second (bpps) for a representative encoded pixel quality (e.g., a specified image quantization level) and image content type (e.g., picture image type, background image type, text image type and video image type).

Traffic manager 140 assembles one or more transfer command queues comprising prioritized Direct Memory Access (DMA) instructions. The DMA instructions are consumed by list processing (i.e., DMA) functions of network interface 150 to ensure the scheduled transfer of encoded media at a relatively constant bit rate as correlated with a control value 164. Encoded media is segmented into packets, packet headers are applied and the encoded media is queued in encoded media queue 124 for transmission.

In an embodiment, network interface 150 provides compatibility with the network 170 and delivers select data link layer, network layer, and session management services including TCP/IP and/or UDP/IP transport services, setup and teardown service, authentication functions, and security protocols such as provision of secure channels and packet encryption. In one or more embodiments, the network interface 150 is coupled to a system bus of host domain 110.

In various embodiments, memory 120, programmable encoder 130, traffic manager 140, network interface 150, and processor system 112 of domain 110 are coupled with the aid of support circuits, including at least one of north bridge, south bridge, chipset, power supplies, clock circuits, data registers, I/O interfaces, and network interfaces. In other embodiments, the support circuits include at least one of address, control, interrupt and/or data connections, controllers, data buffers, drivers, repeaters, and receivers to enable appropriate communications between the CPU processor, memory 120, programmable encoder 130, traffic manager 140, and network interface 150. In some embodiments, the support circuits further incorporate hardware-based virtualization management features, such as emulated register sets, address translation tables, interrupt tables, Peripheral Component Interconnect (PCI) I/O virtualization (IOV) features, and/or I/O memory management unit (IOMMU) to enable DMA operations between memory 120 and programmable encoder 130.

The network 170 comprises a communication system (e.g., the Internet, local area network (LAN), wide area network (WAN), and the like) or similar shared packet switched network that that employs various well-known protocols (e.g., TCP/IP, UDP/IP and the like) to connect computer systems completely by wire, cable, fiber optic, and/or wireless links facilitated by at least one switch 160 comprising congestion manager 162. In an embodiment, congestion manager 162 comprises a processing function of switch 160 (e.g. a combination of CPU, switch queue monitoring facilities, and machine-readable software) designated to execute a control method that generates control value 164. Embodiments of the present invention may also comprise well-known network elements, such as hubs, switches, and/or routers between the host domain 110 and the switch 160, and/or similar other well-known network elements between the switch 160 and a client 180. Other embodiments comprise a plurality of switches similar to switch 160 with congestion manager 162 between a host domain 110 and a client 180.

Figure 8:
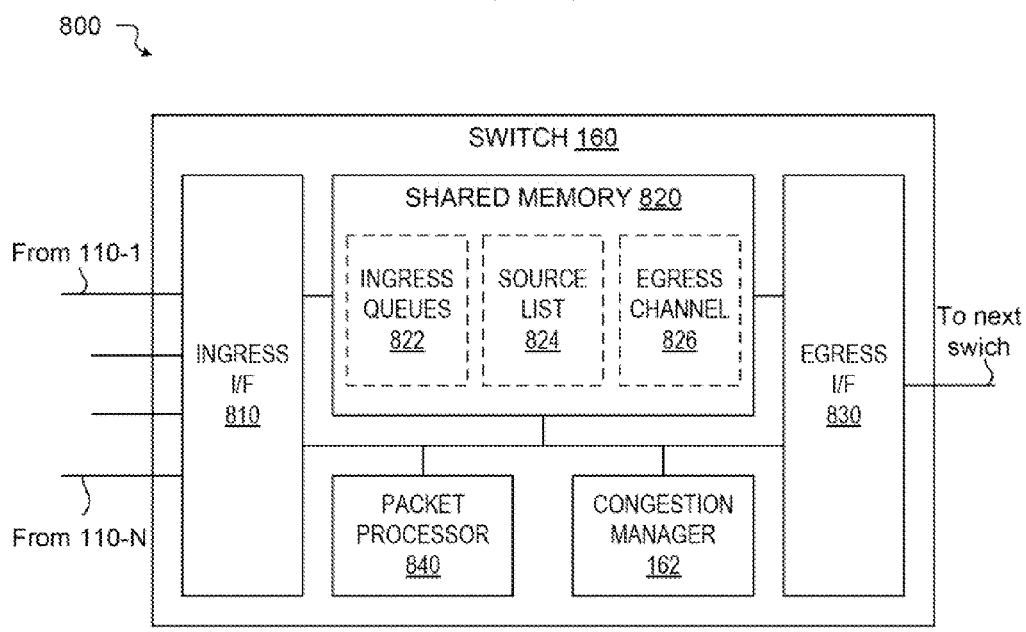
FIG. 8 is a block diagram of a switch enabled to execute bandwidth management functions.

The switch 160 is generally a switch or router enabled to execute the congestion management methods described herein, including determination of control values 164 and communication of control values 164 back to connected host domains 110-1 through 110-N. An embodiment of such a switch 160 is depicted in FIG. 8.

Remote client 180 is generally any form of computing device that can display or store image data and connect to network 170. For example, in an embodiment, client 180 is a remote terminal in a networked computer system (e.g., in an embodiment, system 100 is a remote computing system). Such remote terminals include thin clients, personal or tablet computers, workstations, Personal Digital Assistants (PDAs), wireless devices, storage systems, and the like. In some embodiments, client 180 incorporates an image decoder that decodes image information for presentation on one or more local display devices, such as a remote Graphical User Interface (GUI). In other embodiments, client 180 also comprises one or more peripheral devices such as mouse, keyboard, and/or other well known peripherals.

While the embodiment of FIG. 1 depicts a plurality of clients 180-1 thru 180-N coupled to network 170, it should be noted that aspects of the present invention are of particular relevance to a network architecture in which at least some of the clients 180-1 thru 180-N share a constrained communication channel between the clients themselves and the switch 160. A remote office environment in which a remote facility comprising multiple clients 180-1 thru 180-N is coupled to a corporate datacenter facility by a constrained WAN (e.g., a T1 connection) provides an example of such a network architecture. In such cases, switch 160 might itself provide the gateway to the WAN or it may be a switch located on a high bandwidth LAN within the datacenter, but configured with a map or list of downstream WAN constraints in order to execute congestion management methods related to the downstream constraints.

Figure 2:
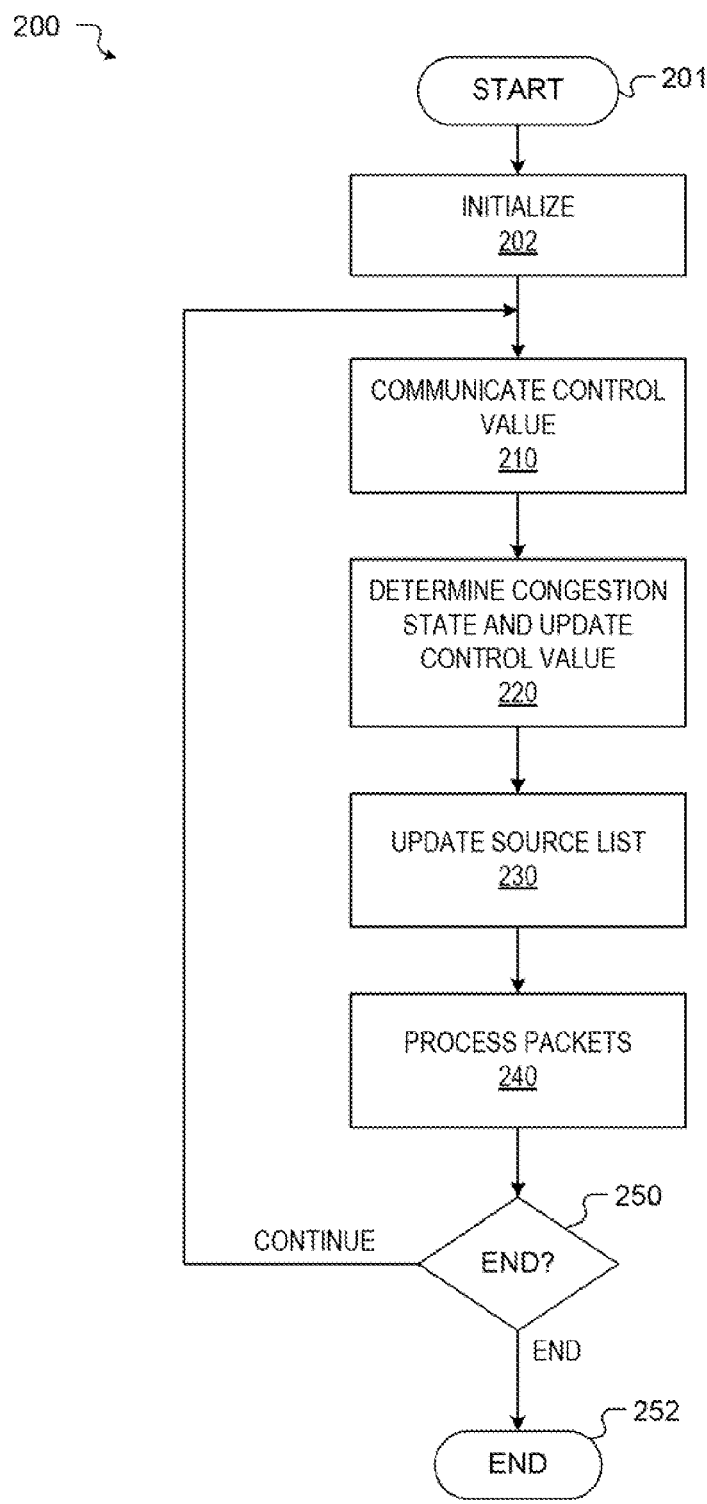
FIG. 2 is a flowchart illustrating a method for determining bandwidth availability control values as executed by one or more switches within a network.

FIG. 2 shows method 200 for determining control values 164. In an embodiment, method 200 is executed by one or more switches 160 within network 170 of FIG. 1, for example by a congestion management function such as congestion manager 162 in FIG. 1. Method 200 manages bandwidth at a system level by providing feedback from switch 160 to traffic managers 140-1 and 140-N and thereby enabling the transmission and regulation of relatively consistent encoded media streams from host domains 110-1 and 110-N. Such an approach is advantageous over generic leaky bucket bandwidth management systems which attempt to control media sources comprising unpredictable transmission rates.

Method 200 starts at step 201 and proceeds to step 202 ("Initialize"). Initialization comprises allocation of resources in the switch, including initialization of ingress media queues, egress channels, switching resources, address tables, processing resources, memory bandwidth, and the like. A source list that maps host domains (e.g., host domains 110) to ingress media queues is established so that it can readily be determined which host domains are associated with each ingress media queue. Typically, each ingress media queue is associated with a communication session between a host domain and a client. In an embodiment in which multiple host domains share a constrained communication channel, the congestion manager (e.g., congestion manager 162 of switch 160) determines which communication sessions share the constrained communication channel and indicates the commonality in the source list such that a set of host domains with a common congestion point can be managed in unison. In some embodiments, one or more host domains pre-subscribe with one or more switches during client session establishment. The pre-subscription step allows the host domain to specify anticipated egress channel usage requirements. In other embodiments, default initial switch resources are allocated to host domains if resource capacity is available, or switch resources are re-allocated each time a new media session is established or an existing session is terminated and the associated subscription expires. An embodiment of an initialization step 202 is described in further detail below.

Method 200 proceeds to step 210 ("Communicate control value") where a common control value (i.e., control value 164 in FIG. 1) is communicated from the switch to each host domain associated with a common egress channel (i.e., a shared communication channel) in the switch. On an initial pass, each host domain may be issued an initial control value, typically computed during initialization, which may be a default value or a value based on communication history, pre-registration information, a predicted accumulated source bandwidth, or the like. In an embodiment, the accumulated source bandwidth (also referred to as the accumulated bandwidth) may be specified as the total received bandwidth for encoded media as measured at the switch (i.e., the accumulated ingress bandwidths from a plurality of host domains using a shared communication channel). For example, if three host domains 110-1, 110-2 and 110-3 are configured for transmission at 1 mb/s (megabits-per-second), 2 mb/s and 5 mb/s respectively, the accumulated source bandwidth as measured at the switch is 1+2+5=8 mb/s. On subsequent cycles through step 210, the control value is updated based on updated ingress bandwidths from the host domains and updated bandwidth information for the shared communication channel (ref. step 220 below). In some embodiments, the control values need not be communicated on every iteration of step 210 in the interests of reducing control traffic on the network. For example, in one embodiment, control values are communicated less frequently when the accumulated source bandwidth and/or egress channel queue depths are within acceptable limits but are communicated more frequently when these parameters fall outside acceptable limits. In another embodiment, control values are communicated more frequently to host domains associated with irregular or bursty transmission rates but less frequently to host domains associated with steady transmission rates.

Method 200 proceeds to step 220 ("Determine congestion state and control value") where the control value is updated based on the current congestion state (as measured by the accumulated source bandwidth of all the host domains of the system using a shared communication channel). In an embodiment, the accumulated source bandwidth is compared to the shared communication channel bandwidth associated with the egress channel of the switch and the difference between accumulated source bandwidth and egress channel bandwidth used to determine the updated control value. To maintain a target queue depth for the egress channel depth (at the switch under control of the congestion manager), the control value may further be adjusted based on a measure of the actual egress queue depth in relation to a target egress queue depth. The window period (i.e., time interval) over which the accumulated source bandwidth is measured may be fixed or variable, for example it may be adjusted according to the attributes of encoded data steams or dynamic network characteristics. Regardless, the actual window period selected is less critical than window periods chosen in alternative congestion controllers because of the relatively consistent individual source bandwidth expected from each host domain (due to the presence of traffic managers 140-1 and 140-N). Additionally, by responding to the accumulated source bandwidth (i.e., the rate at which encoded media is received by switch 160) rather than the total amount of encoded media queued in the switch at any time interval, method 200 provides finer control over individual source bandwidth rates than alternative methods. An embodiment of a step 220 is described in further detail below.

Method 200 proceeds to step 230 ("Update Source List"). The current status of each communication session is verified, for example by conducting an audit of the status of each active communication session or auditing the media queues themselves. The source list is updated to reflect any subscription changes and host domains associated with active communication sessions are notified. In some embodiments, inactive sessions are terminated following a defined period of inactivity and the host domain is notified that a new subscription will be required in order to re-allocate switch resources.

Method 200 proceeds to step 240 ("Process packets") in which shaped traffic (i.e. controlled source bit rate) in the form of packets associated with the various communication sessions are received by the switch 160, queued in the egress channel, and transmitted at a rate that matches the bandwidth of the shared communication channel.

Method 200 proceeds to step 250 ("End?"). If any communication sessions associated with an egress channel in the switch remain active (i.e., at least one host domain continues to transmit packets associated with the communication session), method 200 returns to step 210 and the switch processes additional received packets. If all communication sessions associated with an egress channel have been terminated and associated packets processed, method 200 ends at step 252.

Figure 3:
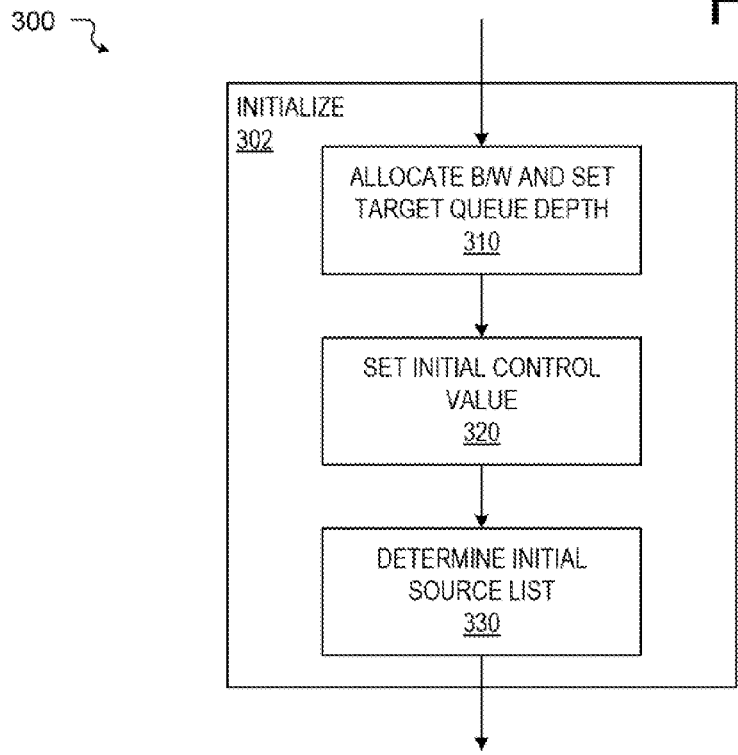
FIG. 3 is a flowchart illustrating a method for initializing a switch with bandwidth allocation and queue depth target parameters.

FIG. 3 shows method 300 comprising initialization step 302 which is an implementation of step 202 in FIG. 2. Method 300 commences with step 310 ("Allocate bandwidth and set target queue depth"). In an embodiment, one or more communication sessions sharing a communication channel are identified as congestion control candidates, for example during a pre-registration sequence or during network path establishment associated with the setup of a client computing session. Each new communication session is associated with a switch egress channel associated with the shared communication channel. The switch allocates a transmission bandwidth value for each new communication session. The transmission bandwidth allocated may be based on default settings, a bandwidth sharing policy, a requested bandwidth, or bandwidth history information stored for previous communication sessions of the same host domain. A target egress queue depth value for the egress channel is determined (typically during switch initialization or network configuration) or merely adjusted (for example in the case of a configuration update). To minimize transmission latency and optimize user interactivity of a remote user interface, a relatively low target egress queue depth with limited excess capacity to support typical transmission variations is generally maintained.

Method 300 proceeds to step 320 ("Set initial control value"). When a switch is initialized or configured, an initial control value is determined as previously described.

Method 300 proceeds to step 330 ("Determine Initial Source List"). In an embodiment a source list comprises a set of host domains associated with each egress channel of the switch, typically sharing a downstream communication channel. The initial source list is based on initial configuration and/or historic configuration data from previous media sessions.

Figure 4:
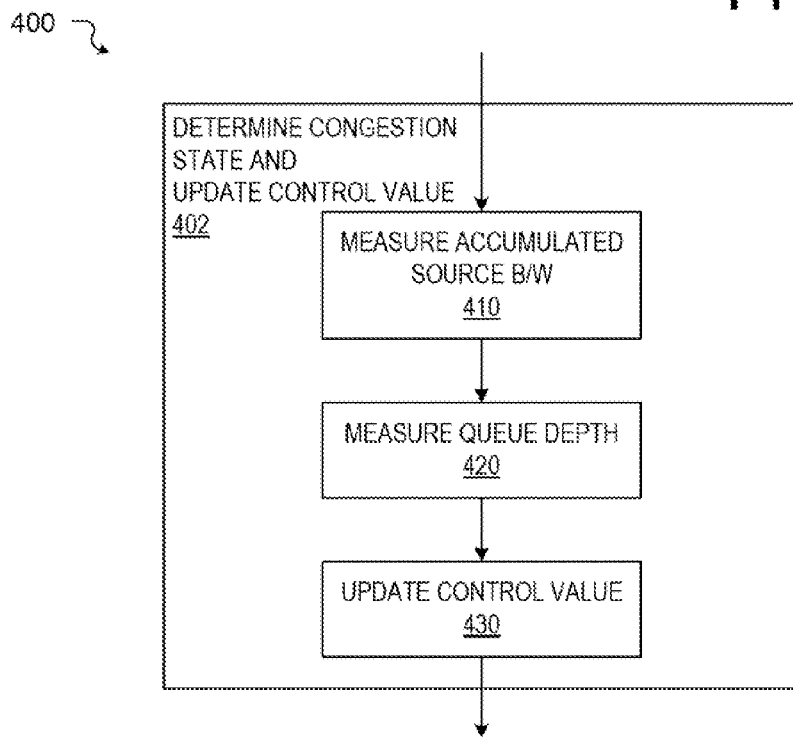
FIG. 4 is a flowchart illustrating a method for determining a congestion state and control value by measuring accumulated source bandwidth.

FIG. 4 shows method 400 comprising step 402 ("Determine congestion state and update control value") which is an implementation of step 220 in FIG. 2. Method 400 commences with step 410 ("Measure accumulated source bandwidth"). The accumulated source bandwidth of media streams for all communication sessions utilizing the egress channel is measured. In an embodiment, such an accumulated source bandwidth is measured by determining the total encoded media received from all sources (i.e., all host domains) associated with the egress channel during a defined window period.

Method 400 proceeds to step 420 ("Measure queue depth") in which the state of the queue of the egress channel is measured. The difference between the actual queue depth and the target queue depth of the egress channel (determined in step 220 of method 200) is used to obtain a queue depth correction factor (QDCF) during the calculation of an updated control value using equation 1 below. The QDCF, which may be a constant value or proportional to the difference between actual and target queue levels, ensures that the actual egress channel queue depth converges on the target queue depth over time.

Method 400 proceeds to step 430 ("Update control value"). The updated control value is generally a function of the current control value, the egress channel bandwidth (i.e., the available bandwidth of the shared communication channel which may be periodically re-evaluated and updated by the congestion manager), the accumulated source bandwidth, and the egress channel queue depth, for example as computed using equation 1.

$$C_{n+1} = (C_n \times ECB/ASB) + QDCF \qquad \text{Equation 1}$$

where
$C_{n+1}$=updated control value
$C_n$=current control value
ECB=Egress channel bandwidth (i.e., current egress bitrate)
ASB=Accumulated source bandwidth
QDCF=Queue depth correction factor The updated control value is then communicated to all sources (i.e., host domains) associated with the egress channel (ref. step 210 of method 200). In response, each host domain determines the available transmission bandwidth for its communication session based on the updated control value and on the size of recent updates to its related source image 122. Each host domain typically adjusts encoding parameters accordingly to meet the available transmission bandwidth. A traffic manager 140 then ensures that packets associated with the communication session are transmitted at the available transmission bandwidth.

Figure 5:
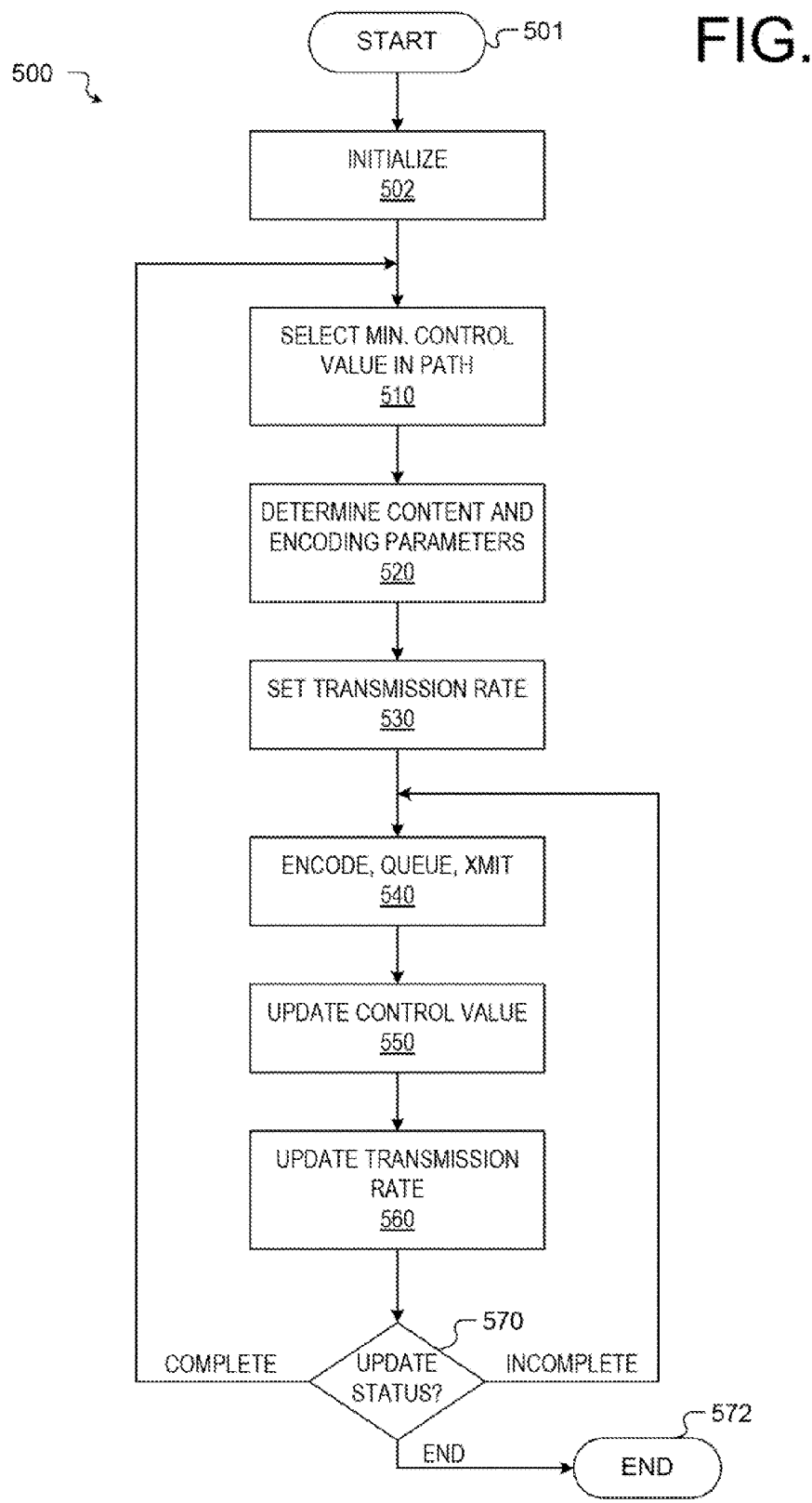
FIG. 5 is a flowchart illustrating a method for managing encoding parameters and encoded media egress bit rate of a host domain in response to control values received from one more switches in a network.

FIG. 5 shows method 500, for managing media communications executed by a host domain, such as host domain 110. Encoding parameters and the transmission rate for encoded media associated with a communication session are determined in response to one or more control values (i.e. $C_n$) received from one or more congestion managers in the network path between the host domain and a client.

Method 500 starts at step 501 and proceeds to step 502 ("Initialize"). A host domain (e.g., host domain 110) establishes a communication session with a client computer (e.g., client 180). A control function for encoder 130 of the host domain initializes a list of control values (e.g., control values 126), comprising one or more control values, each control value related to a switch in the path between the host domain and the client. In various embodiments, the list of control values is initialized according to administrative settings, knowledge of the topology of network 170, or a stored value from previous operation. Each switch is enabled to communicate control values computed using equation 1 back to the host domain. In some embodiments, the host domain pings the client in such a manner (e.g., using a designated network path establishment protocol) that registers the host domain with switches in the media path during session establishment. By such pre-registering, a set of common encoders (e.g., programmable encoders 130-1 through 130-N) sharing a common communication channel are configured for fair sharing at sign-on. In one such embodiment, a set of blade PCs or a set of virtualized desktops (i.e., a set of host domains 110 in FIG. 1) that share an access switch (e.g., switch 160) to a common communication channel with constrained bandwidth are configured with the same control value for the common communication channel. Consequently, all the programmable encoders 1 that share the common communication channel via access switch 160 operate under equivalent constraints with respect to target bandwidth requirements for forthcoming encoded media.

Method 500 proceeds to step 510 ("Select minimum control value in path"). In an embodiment, the host domain listens for control values from congestion managers within switches in the media path to the client and receives a control value from one or more congestion managers. In some cases, the network path is known from a previous media communication session and historic values for select switches are received as initial control value estimates until such time as a current control value is received. In embodiments that receive multiple control values from multiple congestion managers, the host domain selects the minimum control value in the network path to determine encoding parameters and transmission rate.

Method 500 proceeds to step 520 ("Determine content and encoding parameters"). Generally content of a source image (e.g., source image 122) that has changed (i.e., updated) since a previous encoding cycle is selected, encoded based on the selected control value and size of image update, and transmitted. Such updated content may be identified using any of several means such as monitoring dirty bits of memory (e.g., memory 120 of FIG. 1), or comparing sequential frames or sub-sampled frame regions, or monitoring drawing commands associated with the rendering of the source image. If the image update comprises different image types (e.g., picture, text, and background image types), each image type is generally processed by a different encoding method defined by encoding parameters particular to each method. The selected control value specifies encoding parameters for each of the image types designated for encoding. In an embodiment, a look-up table maps the selected control value to a set of encoding parameters (e.g., image compression ratio) for each type of image content. In some embodiments, the encoding parameters consider dynamic attributes of the image content, such as latency requirements or a desired frame update rate for an image type. In select progressive encoding embodiments, the progressive update rate is based on the selected control value.

Different programmable encoders (e.g., programmable encoders 130-1 thru 130-N) generally provide the same mapping between control values and encoding parameters to ensure that a fairly distributed perceptual quality is delivered to different clients (e.g., clients 180-1 thru 180-N). A similar response requires that the different encoders apply the same image attribute definitions; the different encoders use the same criteria for selecting encoding parameters and frame rates, and apply the same encoding priority criteria. For example, if the source image comprises various image types, such as background content, lossless image types (e.g., text image) and lossy image types (e.g., natural images or video content), all host domains provide a similar response by encoding the same image types using the same processing rules. In some embodiments, some host domains may be granted higher or lower performance privileges, in which case the encoding parameters are adjusted from their nominal values accordingly.

Method 500 proceeds to step 530 ("Set Transmission Rate"). An egress bit rate (i.e., transmission bandwidth) for the host domain is selected based on the size of the image update and the frame duration available to communicate the image update at a frame rate specified for the selected control value. In various embodiments, the size of the encoded image update may be predicted or estimated from the size of an image update or portion thereof, prior to encoding (e.g., based on image attributes) or determined directly from the data set size of the encoded portion of the image update after encoding. The size of the encoded image update may either be predicted from the attributes of the changed image or measured directly from the data set following encoding. The traffic manager adjusts the egress bit rate for its host domain to a rate that enables the encoded image update to be communicated at the transmission frame rate associated with the selected control value. Such an adjustment may be accomplished by setting a schedule for transmission from an encoded media queue (e.g., encoded media queue 124) to a network interface (e.g., network interface 150) of the host domain.

Method 500 proceeds to step 540 ("Encode, queue and transmit") in which a portion of the image update of the source image is compressed by a programmable encoder using encoding parameters determined at step 520. The portion of the image update may be a sequential section, a horizontal slice, a vertical slice, a content defined region (e.g. based on image type), a prioritized region (e.g., based on pointer activity) or based on some alternate sequencing scheme. Encoded image data is queued in an encoded media queue (e.g., encoded media queue 124 of FIG. 1) from where the data is transmitted onto a network (e.g., network 170) at a bit rate determined by the first transmission bandwidth value set at step 530. Typically, the transmission loop (comprising step 540, step 550 and step 560) is executed multiple times per source image frame update (i.e., the encoded media queue typically stores only a partial encoded source image frame update) and the bitrate (i.e., egress bandwidth) is adjusted multiple times within the period required to transmit an entire encoded frame update.

Method 500 proceeds to step 550 ("Update control value") in which updated control values are received from one or more switches in the network path between the host domain and the client. In the event that the network path or congestion point has changed, an updated minimum control value is selected. In some embodiments, step 550 comprises a background event handler that receives updated control values independent of the encoding and transmission process.

Method 500 proceeds to step 560 ("Update Transmission Rate") where an updated host domain egress bit rate is selected to correspond with the expected change in throughput of encoded image data due to the updated control value received at step 550 and consequent adjusted transmission frame rate. The updated bit rate may be determined by estimating the total encoded data set size of the frame regions pending transmission in view of the partial frame duration (i.e., time remaining before transmission of the next frame is due) available to communicate the remainder of the frame, as specified by the adjusted frame update rate. Generally, the compression ratio (i.e., encoded image quality) is not adjusted until the completion of a frame transmission to ensure areas of a frame of comparable image type are maintained at comparable quality levels. This prevents adjacent sections of comparable image type from being encoded to different quality levels which may result in visible artifacts.

Method 500 proceeds to step 570 ("Update Status?") where the communication status associated with the current encoded frame update is evaluated. If transmission of the current frame is incomplete, method 500 returns to step 540 where the next region of the source image (e.g., next slice in the frame or next content-defined region) is encoded and transmitted. If transmission of the current frame is complete, method 500 returns to step 510 where an updated control value is determined and updated image content in the next frame of the image is designated for encoding. In an embodiment, the timing of the encoding and transmission (step 540) for encoded image sections of the next image frame is dependent on the completion of transmission of the encoded image from the current image frame. This ensures that only the most recent image update is encoded and further minimizes the latency of the communication session by preventing excessive buffering of encoded image data in the host domain. Note that steps 540, 550 and 560 may be executed multiple times within one frame update cycle. Unlike slow dampened control typical of a video sequence transmission, method 500 responds to control updates (step 550) at a sub-frame rate. As an example, if it takes 100 milliseconds (mS) to transmit an entire updated frame, the sub-loop defined by steps 540, 550, 560 and 570 may operate in the order of a 1 mS sub-loop interval.

Method 500 ends at step 572, for example on termination of the communication session.

Figure 6:
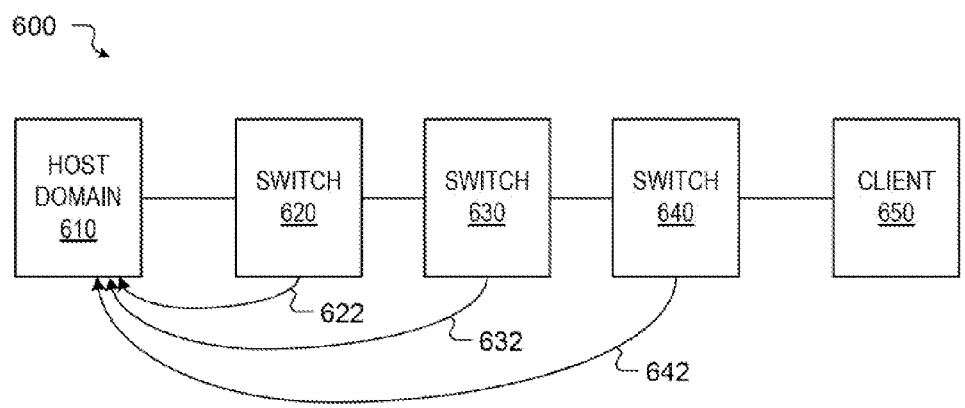
FIG. 6 illustrates a network configuration in which a host domain is coupled to a client via a series of switches, each switch providing control values to the host domain.

FIG. 6 illustrates a network configuration 600 in which a host domain 610 is coupled to a client 650 via a series of network switches 620, 630 and 640. Host domain 610 is an embodiment of host domain 110 in FIG. 1 and client 650 is an embodiment of client 180 in FIG. 1. Switches 620, 630, and 640 are embodiments switch 160 in FIG. 1. Switch 620 periodically communicates a control value 622 to host domain 610, switch 630 periodically communicates a control value 632 to host domain 610, and switch 640 periodically communicates a control value 642 to host domain 610. Host domain 610 compiles a list of control values (ref. control values 126) used to determine encoding parameters (ref. step 520) and set an encoded media transmission rate.

In an embodiment, the frequency at which a switch 620, 630, or 640 communicates updated control values back to host domain 610 is inversely proportional to the latency between the switch and the host domain 610. Switches such as switch 620 located in close proximity to host domain 610 provide low latency control values at a relatively high frequency, while switches such as switch 640 located at distant proximity to host domain 610 (as determined by communication latency) provide less frequent control values to host domain 610. Such a feedback architecture enables tight responsive feedback loops in close proximity to the host domain 610 where congestion likelihood may be higher (e.g., virtualized switches co-located with the host domain 610 or access switches located a short distance from the host domain 610) and relaxed feedback loops associated with distant switches where high latency increases the opportunity for control loop instability.

Figure 7:
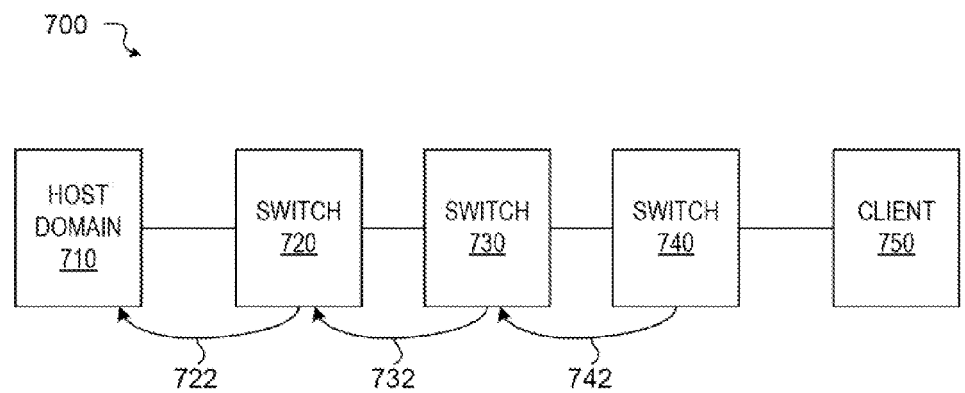
FIG. 7 illustrates a network configuration in which a host domain is coupled to a client via a series of switches, each switch providing a control value to an upstream switch.

FIG. 7 illustrates network configuration 700 which uses an alternate control value communication scheme to configuration 600. Host domain 710 is coupled to a client 750 via network switches 720, 730 and 740. Host domain 720 is an embodiment of host domain 1120 in FIG. 1; client 750 is an embodiment of client 180 in FIG. 1; and switches 720, 730, and 740 are embodiments of switch 160 in FIG. 1. Switch 740 periodically communicates a control value 742 to switch 730. Switch 730 periodically communicates a control value 732 comprising the minimum of control value 742 and its own determined control value to switch 720. Switch 720 periodically communicates a control value 722 comprising the minimum of control value 732 and its own determined control value to host domain 710. Host domain 710 uses the received control value to determine encoding parameters (ref. step 520 in method 500 of FIG. 5) and set an encoded media transmission rate.

In an alternative embodiment, rather than sending control values to the host domain 710, each switch 720, 730, and 740 encapsulates its control value in a packet header and forwards the control value with encoded media to the next switch in the path or, in the case of the last switch in the path, to the client 750. Client 750 receives control values from all enabled switches 720, 730, and 740 in the network path and returns control value information (either a single minimum value or the set of received values) to the host domain 710 as part of the packet acknowledgement structure or using a separate control protocol. In another embodiment, one or more of the switches 720, 730, or 740 maintain a list of control values received from downstream switches (in addition to its own control value). In such an embodiment, host domain 710 need not maintain a set of control values such as control values 126. Rather, such control values are requested from the switch 720 (or, alternatively, the switch 730 or 740) during path establishment. Thereafter, the list of control values is periodically either requested by the host domain or broadcast by the switch (i.e., switch 720, 730 or 740).

FIG. 8 is an illustration 800 of an embodiment of switch 160, generally enabled to execute the method 200 described. Switch 160 comprises ingress and egress interfaces 810 and 830, respectively, each interface comprising physical, data-link, and network layer interfaces known to the art that provide compatibility with network 170. In one embodiment, switch 160 comprises a physical apparatus such as an access switch workgroup switch, or network router. In another embodiment, at least part of switch 160 comprises virtualized elements executed as machine readable instructions in the hypervisor domain or a virtual machine of a server platform. In some such virtualized embodiments, input and/or output physical layer interfaces are substituted with interfaces to memory of the server platform.

Shared memory 820 generally comprises data buffers enabled to queue encoded media and other data types traversing the switch. Such data buffers include ingress queues 822 which comprise one or more data buffers allocated to receive encoded media from active host domains (such as host domains 110-1 and 110-N of system 100) and egress channel 826 allocated to queue encoded media en route to the next common downstream switch or alternative endpoint. Egress channel 826 is a physical or logical memory structure reserved for encoded media associated with encoded media queues 124; other data traversing switch 160 uses alternative physical or logical buffers not depicted in illustration 800. While only one egress channel 826 is depicted in illustration 800, typically each downstream destination address is allocated a separate egress channel (i.e., in an embodiment, egress interface 830 may comprise multiple physical interfaces connected to different downstream switches).

Packet processor 840 generally provides switching and/or routing functions including network protocol processing, bandwidth allocation, scheduling, and generic traffic management functions for managing the flow of encoded media traffic and other network data from ingress interface 810 to egress interface 830. In an embodiment, packet processor 840 comprises one or more processing engines, such as advanced RISC machine (ARM), Microprocessor without Interlocked Pipeline Stages (MIPS), serial data processor (SDP), and/or other RISC cores enabled to execute buffer management, table lookup, queue management, fabric processing, and host processing functions known to the art. In an exemplary embodiment, processor 840 comprises an XSCALE processor from MARVEL corporation or similar switch processor from BROADCOM corporation, operating in conjunction with a suitable host processor such as a POWERPC processor.

Congestion manager 162 generally comprises a processing function enabled to execute select steps of method 200. In an embodiment, congestion manager comprises a logic sequencer, an independent processor (such as a MIPS or PowerPC processor) with a set of machine readable instructions stored in local memory or a set of machine readable instructions executed by a function of a physical or virtualized packet processor 840.

Congestion manager 162 is enabled to configure and manage source list 824 located in memory 820. Alternatively, source list 824 may be located in other memory accessible to congestion manager 162. Source list 824 provides a view of currently subscribed host domains 110 to which control values 164 should be communicated. In one embodiment, congestion manager 162 manages the subscriptions based on the presence or absence of content from particular host domains 110 in the ingress media queues 822. If a particular host domain 110 stops transmitting encoded media for a defined period, the subscription expires and the communication of control values ends until a new communication session is established (ref. step 502 in FIG. 5). Such an embodiment addresses the case of a user leaving a client 180 (FIG. 1) for a short period (e.g., a few minutes) and establishing a different network path when the communication session is re-established.

Congestion manager 162 sets a target queue depth for egress channel 826, monitors the accumulated source bandwidth, associated with ingress queues 822, monitors the egress channel bandwidth and monitors the queue depth associated with egress channel 826. Congestion manager 162 determines and updates control values 164 based on accumulated source bandwidth, egress channel bandwidth and queue depth (ref. equation 1), and communicates the control values 164 back to the active connected host domains 110. In an embodiment in which there is a low network latency between switch 160 and host domain 110, control value 164 may be updated at a sub frame rate of source image 122, for example on the order of 1 mS-5 mS for a 30 frame-per-second source image.

In some embodiments, congestion manager 162 is further enabled to reduce egress channel congestion and/or improve perceptual quality associated with one or more media streams by dropping select encoded media content (such as residual encoding updates associated with a progressive transmission) from ingress queues 822 or egress channel 826. In other embodiments, congestion manager 162 re-prioritizes select media content (such as initial quantized content transmission associated with a progressive transmission) in the ingress queues or egress channel. In other embodiments, congestion manager 162 notifies host domains 110 in the event of buffer overflow such that the host domains 110 don't need to wait for a round trip response on network 170.

FIG. 9 is a block diagram 900 of the programmable encoder 130 in accordance with one or more embodiments of the present invention. The programmable encoder 130 is an image encoder comprising a progressive encoder function 902. The progressive encoder function 902 includes a transform function 904, a quantize function 906, and an entropy encoder function 908 which each operate under management of encoder manager 950 to adjust the frame update rate, apply the transform function 904 to one or more changed regions of source image 122, apply the quantize function 906 to the resulting transform coefficients and perform the entropy coder function 908 on the quantized values. In one or more embodiments, components of the programmable encoder 130 are implemented in software modules, ASIC, FGPA, or any combination thereof.

The encoder manager 950 is generally a controller, such as an embedded processing core (e.g., a microprocessor core from MIPS Technologies), and related software functions and/or a logic circuit configured to manage the various functions of encoder 130. Encoder manager 950 configures the progressive encoder function 902 according to compression requirements as determined from the minimum control value of the set of control values 126 received as control values 164. In an embodiment, suitable encoding parameters are determined from the set of encoding parameters 952 based on a particular control value and media content attributes, such as image type, and priority information as described for step 520 of method 500. In some embodiments, encoder manager 950 also provides Direct Memory Access (DMA) resources for accessing source image 122, storing encoded media in encoded media queue 124, and accessing other data in host domain 110 such as control values 126, a dirty mask associated with source image 122 if implemented, drawing commands, hints and/or software-derived motion vectors related to sections of source image 122.

In some embodiments, the source image 122 is streamed to programmable encoder 130 over an image bus, such as a Digital Visual Interface (DVI) interconnect, and a change detection function performs an in-line comparison with a reference image or associated hash values to determine image regions changed since a previous encoding cycle. In other embodiments, such as various embodiments in which programmable encoder 130 is coupled to the CPU of host domain 110 by a PCI-EXPRESS interconnect, the CPU generates a descriptor list detailing which regions of source image 122 have changed. Changed regions are then copied to the programmable encoder under DMA control preceding encoding, as described for method 300. In other embodiments, programmable encoder 130 is implemented as software in host domain 110 and source image 122 is accessed from addressable memory.

The transform function 904 applies a transform function to sub-sampled changed regions of source image 122 using Discrete Wavelet Transform (DWT), Discrete Cosine Transform (DCT), Discrete Fourier Transform (DFT), or alternative comparable image transform methods known to the art. The quantize function 906 reduces the number of bits of the resulting transformed coefficients by reducing a precision for each resulting transformed coefficient. Progressive encoding is accomplished by encoding a highly quantized output image and then increasing the quality of the highly quantized image display by successively adding coefficient refinement information using various quantization techniques. The encoder quantization control parameters 922 derived from encoding parameters 952 and control values 126 change the quantization level in order to adjust the compression ratio of one or more specified regions, resulting in changed data throughput and increased or decreased perceptual image quality. In one embodiment, a high compression ratio is accomplished by setting aggressive coefficient values in one or more quantization tables so that compressed region updates consume a limited available bandwidth. High image quality is accomplished by reducing the quantization level of quantize function 906 to produce perceptually lossless or near-lossless representations of the output image. In another embodiment, the progressive update rate is also adjusted via quantization control parameters 922 to reduce latency or increase image quality under some specified bandwidth constraint. In order to minimize the latency between an occurrence of one or more changes in the source image 122 and an encoding of the one or more changes, the frame update rate is increased. When image quality is prioritized, the frame update rate is lowered in order to limit the bandwidth required to transmit the higher quality image representation. The entropy coder function 908 further compresses the quantized values using lossless coding methods such as Huffman encoding, Golomb coding, variable length coding (VLC), context-adaptive VLC, context-adaptive binary arithmetic coding (CABAC) or comparable methods.

In an alternative embodiment, programmable encoder 130 further comprises a front-end temporal scaling function that performs temporal sub-sampling of the source image 122 or specified regions, such as changed areas within the source image 122, at a sample rate specified by encoder manager 950. In one embodiment, one or more regions for which a minimum latency is required for display updates, such as those regions associated with the pointer location, are assigned a maximum sample rate. Then, the temporal scaling function passes the full frame image signal to the transform function 904. In cases where content types are specified for encoding at a reduced quality, for example as determined by administrative policies (e.g., video content specified for reduced quality), only a reduced number of image frames need be forwarded to the transform function 904 for the regions comprising such content. Such sub-sampling may be strictly periodic, or based on knowledge of the image content, or based on change characteristics or a combination thereof.

According to various embodiments, the programmable encoder 130 includes one or more of: a programmable embedded digital media processor; a Field Programmable Gate Array (FPGA) or an Application Specific Integrated Circuit (ASIC) configured, at least in part, as a logic circuit to perform image encoding; other processors and/or electronic hardware suitable for performing image encoding; and any combination of the foregoing. In some embodiments, the programmable encoder 130 is implemented, at least in part, as a set of computer-executable instructions.

Figure 10:
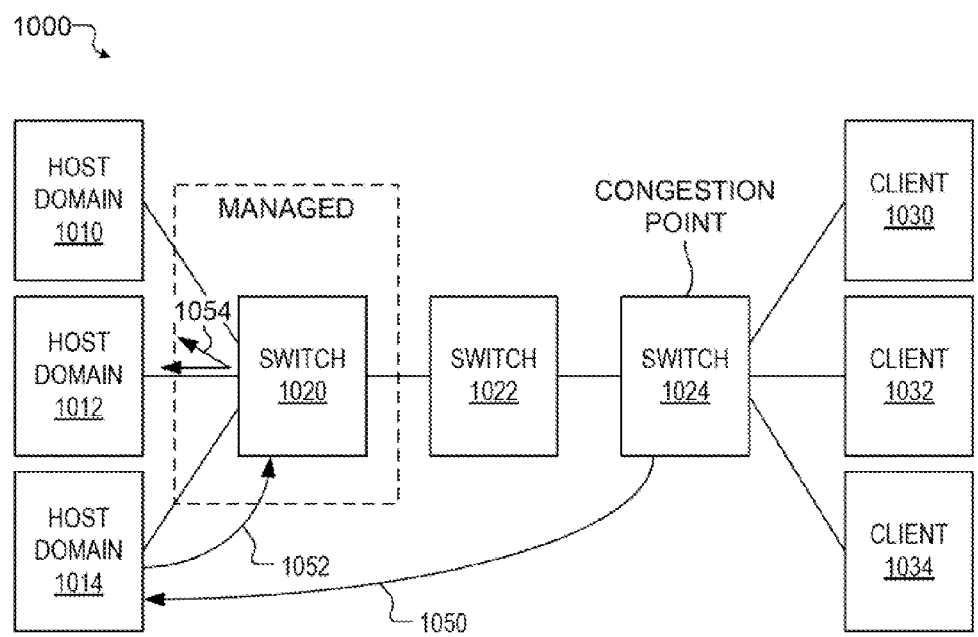
FIG. 10 illustrates a system comprising a selection of host domains, each coupled to a corresponding one of a selection of clients via a common series of switches.

FIG. 10 illustrates system 1000 comprising a selection of host domains 1010, 1012, and 1014, each coupled to a corresponding one of a selection of clients 1030, 1032, and 1034, respectively, via a series of switches 1020, 1022, and 1024. In an embodiment, the host domains 1010, 1012, and 1014 and clients 1030, 1032, and 1034 of system 1000 are similar to the host domains 110 and clients 180 of system 100 previously described.

In an embodiment, and without loss of generality, switch 1020 comprises congestion management capabilities similar to those described for switch 160 of system 100 but switches 1022 and 1024 lack an ability to determine control values (ref. equation 1). In other embodiments, some switches comprise congestion management functions as described for method 200 but other switches lack such capabilities. In the event of congestion at switch 1024 associated with the media session between host domain 1014 and client 1034, switch 1024 notifies host domain 1014 (shown as congestion notification communication 1050) by using one of several methods known to the art (e.g., Explicit Congestion Notification (ECN) or packet drop notification). Host domain 1014 responds by adjusting its transmission rate and notifying switch 1020 of the control value corresponding to its adjusted transmission rate (shown as control value communication 1052). Switch 1020 then provides the same control value to the other host domains 1012 and 1010 which lower their own transmission rates accordingly using control value communication 1054. Such a lowering of all or select transmission rates results in a relief of identified congestion points in the network path.

Figure 11:
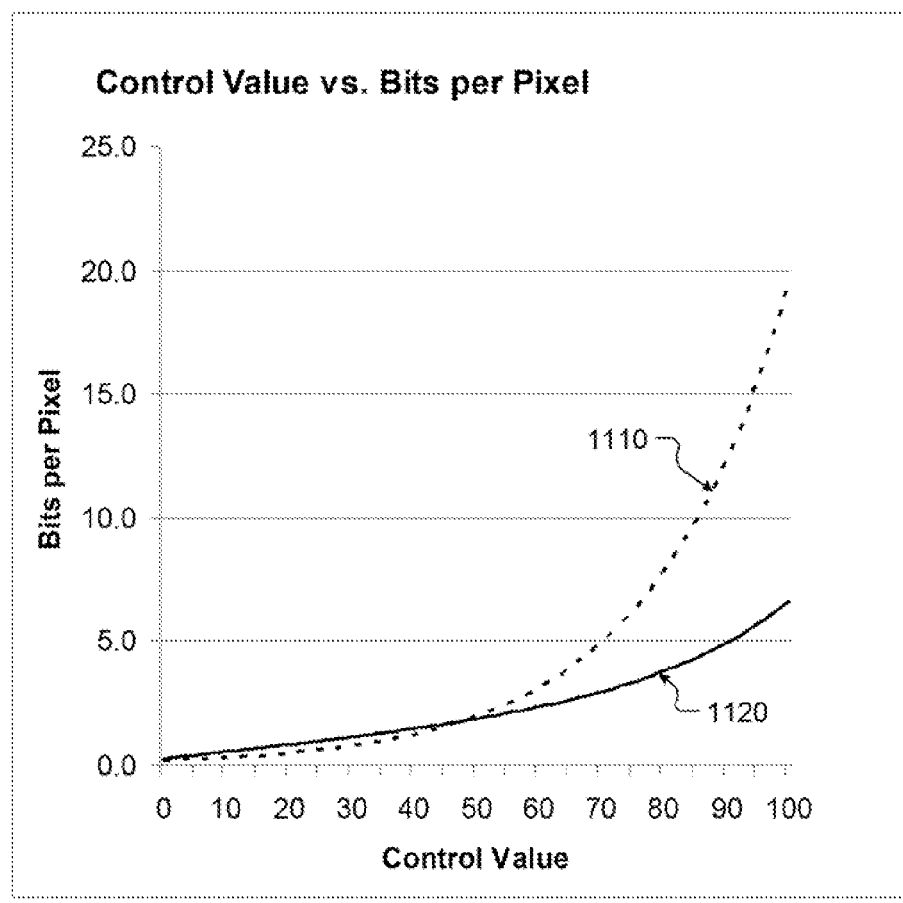
FIG. 11 is a graphical diagram of a graph depicting a range of compression ratios for an exemplary set of control values.

FIG. 11 illustrates graph 1100 showing an ideal range of compression ratios (in terms of compressed bits per pixel (bpp) achieved, for example, by adjusting the image quantization) for an exemplary set of control values spanning the range 0 through 100. In graph 1100, a control value of "0" determines an illegible image (for example, as defined using a subjective Mean Opinion Score (MOS) index) while a control value of "100" determines a lossless image. Plot 1110 shows a compression range from 0 bpp for an illegible image determined by a control value of "0" through approximately a compression ratio of 20 bpp for a control value of "100" for a video display image (i.e., an image frame of picture type). Plot 1120 shows a compression range from 0 bpp for an illegible image determined by a control value of "0" through a compression ratio of 7 bpp for a control value of "100" for a display image of mixed image type (i.e., an image frame comprising different areas of text, background and picture image types). The image of mixed image type achieves better compression when the different image types are subjected to different encoding methods (e.g., background image types are highly compressed when expressed in terms of rectangular descriptors, text image types are suited to color cache encoding methods, and picture image types are suited to transform encoding methods such as wavelet or Discrete Fourier Transform (DCT) encoding).

Figure 12:
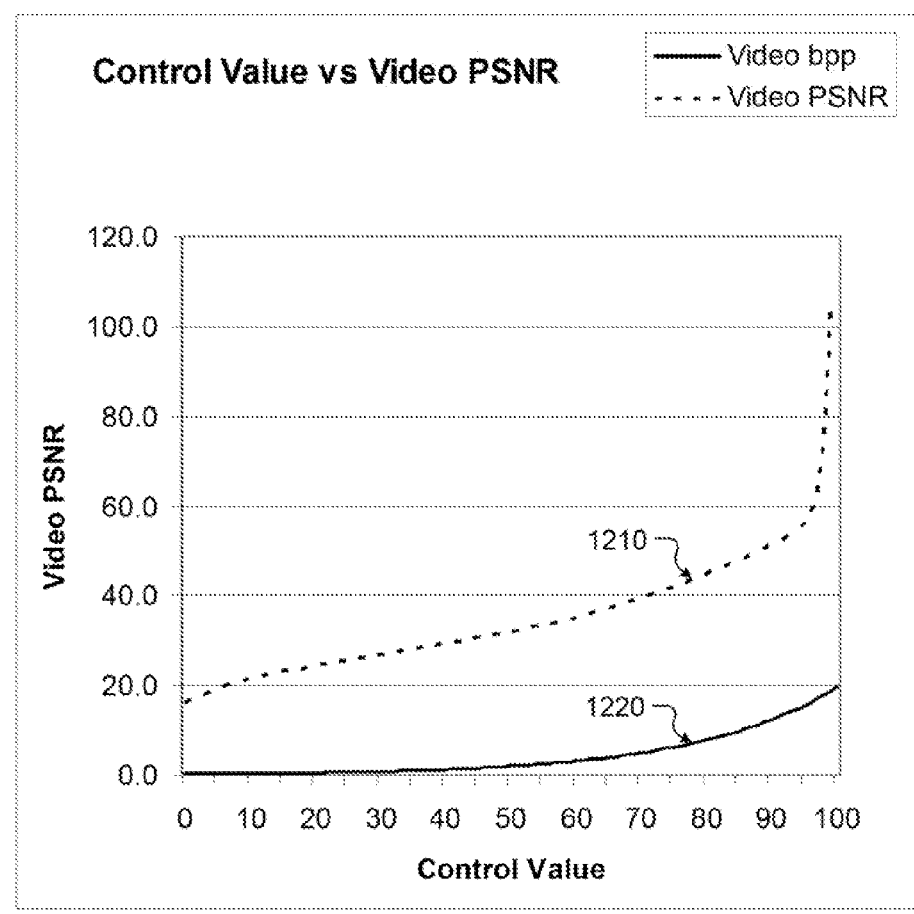
FIG. 12 is a graphical diagram of a graph showing two related video metrics as a function of control value.

FIG. 12 illustrates graph 1200 showing two related video metrics as a function of control value for a set of control values spanning the range 0 through 100. Plot 1210 shows the Peak Signal to Noise ratio (PSNR) for a video image frame across the span of control values. Plot 1220 is an overlay of plot 1110 from FIG. 11 which shows the compression ratio required to achieve the PSNR of plot 1210. The divergence between PSNR and bpp for control values in the range of 90-100 is attributed to the fact that perceived image quality of a video or picture image types does not have a linear correlation with the image PSNR.

Figure 13:
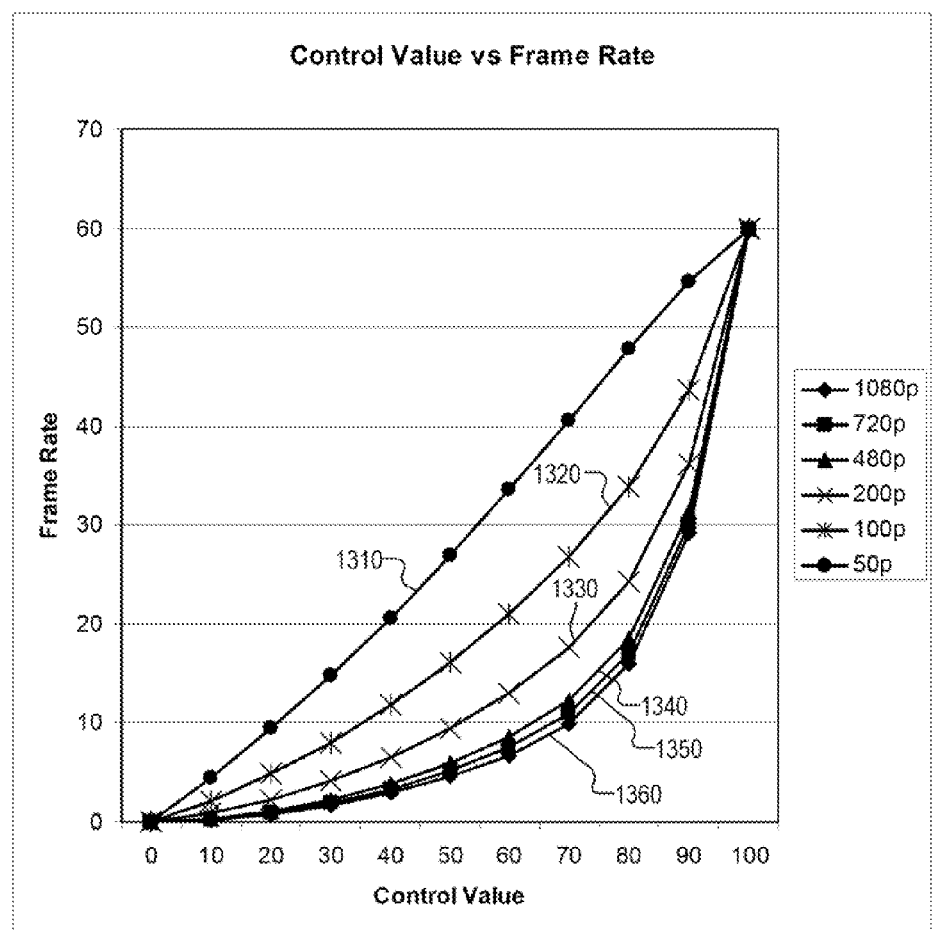
FIG. 13 is a graphical diagram of a graph depicting required compression ratios for a set of video sequences.

FIG. 13 illustrates graph 1300 showing required compression ratios in terms of bits per second (bps) for a set of video sequences over the range of control values between 0 and 100. Plot 1310 depicts bps for a 50 p progressive display video (i.e., 50 lines video type), plot 1320 depicts bps for a 100 p progressive display video, plot 1330 depicts bps for a 200 p progressive display video, plot 1340 depicts bps for a 480 p progressive display video, plot 1350 depicts bps for a 720 p progressive display video, and plot 1360 depicts bps for a 1080 p progressive display video.

While the foregoing is directed to embodiments of the present invention, other and further embodiments of the invention may be devised without departing from the basic scope thereof, and the scope thereof is determined by the claims that follow.

The invention claimed is:

1. A method for managing media communications, the method executed under the control of a processor configured with computer executable instructions, the method comprising:
   establishing, by a host domain, a session to a client computer over a network and through a switch of the network;
   generating, by the host domain, a first frame of an image stream;
   identifying a first updated region of the first frame;
   determining a first image size of the first updated region;
   compressing, by the host domain and based on a control value received by the host domain from a congestion manager, the first updated region to generate a first encoding;
   transmitting the first encoding over the session at a first bit rate determined from a first frame rate requirement that is determined from the first image size and the control value;
   generating, by the host domain, a second frame of the image stream;
   identifying a second updated region of the second frame with respect to the first frame;
   identifying a second image size of the second updated region, wherein the second image size is larger than the first image size;
   compressing, by the host domain and based on the control value, the second updated region to generate a second encoding; and
   transmitting the second encoding over the session at a second bit rate determined from a second frame rate that is determined from the second image size and the control value, wherein the second bit rate is different from the first bit rate and the first frame rate is higher than the second frame rate in response to the second image size being smaller than the first image size while the control value is unchanged at least while compressing the first updated region to transmitting the second encoding.

2. The method of claim 1, wherein the congestion manager determines the control value by monitoring a transmission of packets of the session by the switch.

3. The method of claim 2, wherein the network is an Internet Protocol (IP) network, the switch is at least one of an IP switch or a IP router, and wherein the switch comprises the congestion manager and the host domain receives the control value via the IP network.

4. The method of claim 1, wherein the network is an Internet Protocol (IP) network and the image stream is generated by a plurality of applications of the host domain, from user interaction at the client computer, for display by the client computer.

5. The method of claim 1, wherein the first encoding comprises a first quantization level determined from the control value and the first image size and the second encoding comprises a second quantization level determined from the control value and the second image size, wherein the first quantization level is different from the second quantization level and wherein the first image size and the second image size comprise a different number of pixels.

6. The method of claim 1, wherein compressing the first updated region comprises (i) a lossless compressing of a text image of the first updated region and (ii) a lossy compressing of a picture image of the first updated region.

7. The method of claim 1, wherein the control value is a continuously updated common value communicated to a plurality of host domains in the network and used to control an image encoding quality and a transmission frame rate of each encoding of each frame of an image stream of an associated host domain.

8. The method of claim 1, wherein compressing the first updated region of the first frame comprises determining a progressive update frame rate to the first updated region of the first frame based on the control value.

9. The method of claim 1, wherein the second updated region of the second frame comprises changes to a frame buffer of the image stream, wherein the changes occur after compressing the first updated region of the first frame of the frame buffer and transmitting the first encoding, wherein the changes comprise at least one update of a plurality of spatially and temporally sporadic updates to the frame buffer generated by a plurality of applications of the host domain.

10. The method of claim 1, wherein a first update period of the first frame is different from a second update period of the second frame based on a first transmission time of the first encoding.

11. The method of claim 10, wherein a frame rate of the image stream is sporadic based on asynchronous image generation by applications of the host domain and individual transmission times of each encoded frame of the image stream over the session, and wherein the first update period is delayed from a previous frame based on a timing of the first updated region of the first frame by the applications, and wherein the second image size is determined by comparing the first frame to the second frame at a time determined by the first transmission time.

12. The method of claim 1, wherein the second image size is determined by a plurality of applications executing in the host domain during a communication period that comprises compressing the first updated region of the first frame and transmitting the first encoding, wherein a size of the first encoding and the communication period are based on the control value.

13. The method of claim 1, wherein the first updated region of the first frame is generated by a first application of the host domain, the second updated region of the second frame is generated by a second application of the host domain, and the first updated region of the first frame is spatially separate from the second updated region of the second frame.

14. The method of claim 1, wherein the image stream is a temporally sporadic sequence of constant frame size images comprising spatially sporadic updated regions generated by a plurality of applications of the host domain, wherein the spatially sporadic updated regions comprise the first updated region of the first frame and the second updated region of the second frame.

15. The method of claim 1, wherein the second updated region of the second frame is determined by comparing the second frame to the first frame to detect updated content.

* * * * *